United States Patent [19]
Aoyama et al.

[11] Patent Number: 6,156,867
[45] Date of Patent: *Dec. 5, 2000

[54] POLYESTER POLYMERIZATION CATALYST, A PRODUCTION METHOD THEREOF, AND A POLYESTER PRODUCTION METHOD USING SAID CATALYST

[75] Inventors: Masatoshi Aoyama; Kenichi Tsutsumi; Minoru Uchida, all of Shizuoka, Japan

[73] Assignee: Toray Industries, Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/180,557
[22] PCT Filed: Mar. 24, 1998
[86] PCT No.: PCT/JP98/01275
§ 371 Date: Nov. 6, 1998
§ 102(e) Date: Nov. 6, 1998
[87] PCT Pub. No.: WO98/42769
PCT Pub. Date: Oct. 1, 1998

[30] Foreign Application Priority Data

Mar. 25, 1997 [JP] Japan ..................................... 9-071870
Jun. 4, 1997 [JP] Japan ..................................... 9-146781

[51] Int. Cl.[7] .............................. C08G 63/78; B01J 31/00
[52] U.S. Cl. .......................... 528/282; 528/272; 528/274; 528/279; 528/280; 528/308; 528/308.6; 524/714; 524/724; 524/767; 524/777; 502/102; 502/111; 502/117; 502/132; 502/164; 502/170; 502/172
[58] Field of Search ..................... 528/272, 274, 528/279, 280, 282, 308, 308.6; 524/714, 724, 767, 777; 502/102, 111, 117, 132, 164, 170, 172

[56] References Cited

U.S. PATENT DOCUMENTS

| | | | |
|---|---|---|---|
| 3,528,945 | 9/1970 | Stewart et al. | 528/282 |
| 3,528,946 | 9/1970 | Stewart et al. | 528/282 |
| 3,533,973 | 10/1970 | Stewart et al. | 528/277 |
| 4,565,845 | 1/1986 | Inoue et al. | 525/25 |
| 5,391,700 | 2/1995 | Itoh et al. | 528/297 |
| 5,512,340 | 4/1996 | Goodley | 428/35.7 |
| 5,596,069 | 1/1997 | Goodley | 528/280 |
| 5,693,786 | 12/1997 | Tanaka et al. | 536/107 |
| 5,719,214 | 2/1998 | Tanaka et al. | 524/47 |

FOREIGN PATENT DOCUMENTS 49-032676  9/1974  Japan .

*Primary Examiner*—Samuel A. Acquah
*Attorney, Agent, or Firm*—Austin R. Miller

[57] ABSTRACT

The present invention relates to a polyester polymerization catalyst, comprising a solution containing an aluminum compound and an alkali compound, with water or an organic solvent or a mixture consisting of water and an organic solvent as the medium, a production method thereof, and a polyester production method, in which the product obtained by the esterification reaction or ester interchange reaction between an aromatic dicarboxylic acid or any of its ester forming derivative and a diol is polycondensed, to produce a polyester, comprising the use of said polymerization catalyst containing an aluminum compound.

The present invention can provide a polyester excellent in processability and can overcome such problems as spinneret contamination, filtration pressure rise, filament breaking, film breaking and foreign matter production in the production process of products such as fibers, films, resins and bottles.

15 Claims, No Drawings

POLYESTER POLYMERIZATION CATALYST, A PRODUCTION METHOD THEREOF, AND A POLYESTER PRODUCTION METHOD USING SAID CATALYST

A polyester polymerization catalyst, a production method thereof, and a polyester production method using said catalyst

TECHNICAL FIELD

The present invention relates to a polyester polymerization catalyst, a production method thereof, and a polyester production method using said catalyst. In more detail, the present invention relates to an polyester polymerization catalyst for producing a polyester excellent in pocesssability and color tone, a production method thereof, and a polyester production method using said catalyst.

BACKGROUND ART

Polyesters are used widely in various fields for fibers, films, resins and bottles because of their excellent properties. Among them, polyethylene terephthalate is favorably used since it is excellent in mechanical strength, chemical properties, dimensional stability, etc.

In general, polyethylene terephthalate is produced from terephthalic acid or any of its ester forming derivatives and ethylene glycol. In this case, in commercial processes for producing high molecular polymers, antimony compounds are widely used as polycondensation catalysts. However, polymers containing any antimony compound have the following several unpreferable properties.

For example, when a polyester obtained by using an antimony catalyst is melt-spun into fibers, it is known that the residue of the antimony catalyst is deposited around the holes of a spinneret. The reason why the residue of the antimony catalyst is deposited is considered to be that antimony exists as antimony glycolate in the polymer and that it is modified near the spinneret, and partially vaporized and dissipated, while a component mainly composed of antimony remains at the spinneret. If the deposit grows, it causes filament breaking, etc. and must be removed from time to time.

Furthermore, the antimony catalyst residue in the polymer is likely to be relatively large grains, and acts as a foreign matter, causing such unpreferable phenomena as filtration pressure rise at the time of processing, filament breaking at the time of spinning, and film breaking at the time of film formation.

Because of the above problems, a polyester having very small or zero in antimony content is being demanded.

To solve the problems, U.S. Pat. No. 5,512,340 and U.S. Pat. No. 5,596,069 propose to use an aluminum compound such as aluminum chloride or aluminum hydroxychloride and a cobalt compound together. However, in general, an aluminum compound has such problems that it is unlikely to be dissolved in a glycol such as ethylene glycol and the polyester reaction system, and if it is added to the polyester reaction system as a polycondensation catalyst, an insoluble foreign matter is formed to cause filament breaking at the time of spinning and film breaking. After all, the problems of antimony cannot be sufficiently avoided.

DISCLOSURE OF THE INVENTION

The object of the present invention is to provide a polyester polymerization catalyst for producing a polyester, which overcomes the disadvantages of the polyester containing said antimony compound and the disadvantages caused when an aluminum compound is used as a polymerization catalyst, and also to provide a production method thereof and a polyester production method using said catalyst.

The present invention relates to a polyester polymerization catalyst, comprising a solution containing an aluminum compound and an alkali compound, with water or an organic solvent or a mixture consisting of water and an organic solvent as the medium, and also relates to a production method thereof and a polyester production method using said catalyst.

THE MOST PREFERRED EMBODIMENTS OF THE INVENTION

The polyester of the present invention is a polymer synthesized from a dicarboxylic acid or any of its ester forming derivatives and a diol, and is not especially limited as far as it can be used as such products as fibers, films and bottles.

The dicarboxylic acids which can be used here include, for example, dicarboxylic acids such as terephthalic acid, naphthalenedicarboxylic acid, adipic acid, isophthalic acid, sebacic acid, phthalic acid and 4,4'-diphenyldicarboxylic acid, and their ester forming derivatives such as dimethyl esters. The diols which can be used here include ethylene glycol, propylene glycol, butanediol, polyethylene glycol, diethylene glycol, hexamethylene glycol, cyclohexanedimethanol, neopentyl glycol and polypropylene glycol.

The polyesters which can be produced from the above include, for example, polyethylene terephthalate, polytetramethylene terephthalate, polycyclohexylenedimethylene terephthalate, polyethylene-2,6-naphthalenedicarboxylate, polyethylene-1,2-bis(2-chlorophenoxy)ethane-4,4'-dicarboxylate and polypropylene terephthalate. Among them, the present invention is suitable for the most generally used polyethylene terephthalate or a copolyester mainly composed of polyethylene terephthalate.

These polyesters can also have another comonomer copolymerized. The comonomers which can be used here include other dicarboxylic acids such as adipic acid, isophthalic acid, sebacic acid, phthalic acid and 4,4'-diphenyldicarboxylic acid, and their ester forming derivatives, dihydroxy compounds such as polyethylene glycol, diethylene glycol, hexamethylene glycol, neopentyl glycol and polypropylene glycol, other hydroxycarboxylic acids such as p-(β-hydroxyethoxy)benzoic acid, and their ester forming derivatives.

The aluminum compound in the present invention is not especially limited. However, aluminum organic compounds which can be relatively easily dissolved in a diol such as ethylene glycol used for producing polyethylene terephthalate, and aluminum compounds which are relatively high in aluminum atom content and can provide sufficient catalytic activity with a small amount are preferable.

Examples of the former include the aluminum organic compounds represented by the following general formula (1):

$$Al[OR_1]_l[OR_2]_m[OR_3]_n[R_4]_o \qquad (1)$$

(where $R_1$, $R_2$ and $R_3$ stand for, respectively independently, an alkyl group, aryl group, acyl group or hydrogen atom, $R_4$ stands for an alkyl acetoacetate ion or acetylacetone ion, $R_1$, $R_2$ and $R_3$ are identical or different, subject to the condition that at least one of $R_1$, $R_2$, $R_3$ and $R_4$ does not stand for a hydrogen atom; and l, m, n and o stand for, respectively independently, 0 or a positive number, subject to l+m+n+o=3.)

Concretely they include carboxylic acid salts such as aluminium acetate, aluminium benzoate, aluminium lactate, aluminium laurate, aliminium stearate and aluminum alcholates in which the hydrogen atom of the hydroxyl group of an alcohol is substituted by aluminum element, such as aluminum ethylate, aluminum isopropylate, aluminum tri-n-butyrate, aluminum tri-sec-butyrate, aluminum tri-tert-butyrate and mono-sec-butoxyaluminum diisopropylate, and aluminum chelates in which the alkoxy group of an aluminum alcoholate is partially or wholly substituted by a chelating agent such as an alkyl acetoacetate or acetylacetone, such as ethyl acetoacetate aluminum diisopropylate, aluminum tris(ethyl acetate), alkyl acetoacetate aluminum diisopropylate, aluminum monoacetylacetate bis(ethyl acetoacetate), aluminum tris(acetyl acetate), aluminum monoisopropoxymonooleoxyethyl acetoacetate and aluminum acetylacetonate.

Among them, aluminum carboxylates and aluminum alcoholates are especially preferable.

Examples of the latter include hydroxides, chlorides and hydroxychlorides of aluminum. Concretely they include aluminum hydroxide, aluminum chloride, aluminum hydroxychloride, etc. Among them, aluminum hydroxide is especially preferable since the polymer obtained is good in heat resistance and color tone since it does not contain any halogen atom. The aluminum acetate of the present invention can also be generally marketed so-called basic aluminum acetate.

The alkali compounds which can be used in the present invention refer to alkali compounds in a wide sense, i.e., the whole of a group consisting of alkali metal hydroxides, alkaline earth metal hydroxides, and also alkali metal carbonates, ammonia, amines and their derivatives, for example, as stated in Dictionary of Physicochemistry (Rikagaku-Jiten in Japanese) (3rd edition, revised and enlarged, Iwanami Shoten, 1982), etc.

In the present invention, among these alkali compounds, nitrogen-containing compounds are preferable since the polyester compositions obtained are especially good in color tone.

Preferable nitrogen-containing compounds of the present invention include, for example, those represented by the following formulae (2) and (3):

Formula (2)

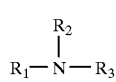

[where $R_1$, $R_2$ and $R_3$ stand for, respectively independently, a hydrogen atom, alkyl group, aryl group and allyl group.]

Formula (3)

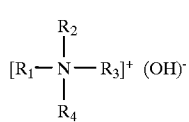

[where $R_1$, $R_2$, $R_3$ and $R_4$ stand for, respectively independently, a hydrogen atom, alkyl group, aryl group and allyl group.]

Concretely the compounds of formula (2) include ammonia, diethylamine, trimethylamine, triethylamine, tripropylamine, tributylamine, etc. The compounds of formula (3) include tetramethylammonium hydroxide, tetraethylammonium hydroxide, tetrapropylammonium hydroxide, tetrabutylammonium hydroxide, trimethylbenzylammonium hydroxide, etc.

Other compounds than those represented by the formulae (2) and (3) which can be used here include derivatives of the compounds represented by the formulae (2) and (3), ethylenediamine, tetraethylenediamine, hexamethylenediamine pyridine, quinoline, pyrroline, pyrrolidone, piperidine, etc.

As the nitrogen-continuing compounds of the present invention, among the above compounds, tertiary amine compounds and quaternary ammonium compounds are preferable since the amount of the foreign matter produced in the polyester composition obtained is especially small. Furthermore, compounds which are volatilized at 280° C. or lower are preferable since the amount remaining in the finally obtained polyester composition is small to improve the color tone of the polyester composition. The compounds include tertiary amine compounds such as trimethylamine, triethylamine, tripropylamine and tributylamine, and quaternary ammonium compounds such as tetramethylammonium hydroxide, tetraethylammonium hydroxide, tetrapropylammonium hydroxide, tetrabutylammonium hydroxide and trimethylbenzylammonium hydroxide.

The aluminum compound of the present invention must be mixed with a solvent containing the alkali compound before it is added to the reaction system of the polyester. The inventors found that when an aluminum compound generally likely to form an insoluble foreign matter in the polyester is used as a polyester polymerization catalyst, if the compound is finely dispersed in a solvent containing the alkali compound before it is added to the reaction system, the compound is unlikely to form any insoluble foreign matter still after it is added to the reaction system. Thus, the present invention has been completed.

It is especially preferable to mix the alkali compound with water for making an aqueous solution and then to mix the aluminum compound with the aqueous solution, since the aluminum compound can be homogeneously dispersed or dissolved in the aqueous solution, to inhibit the production of the foreign matter in the polyester. Furthermore, it is preferable to dilute the aqueous solution containing the aluminum compound by the diol component of the polyester such as ethylene glycol before the aqueous solution is added to the reaction system, since the local concentration due to sudden temperature change is unlikely to occur.

When the aluminum compound is mixed with such a mixture with the alkali compound contained in water or an organic solvent or a mixture consisting of water and an organic solvent, it is preferable that the concentration of the alkali compound is 0.5 to 50 wt %, especially 1 to 40 wt % based on the amount of the water or the organic solvent or the mixture consisting of water and an organic solvent, since the aluminum compound added later can be more easily dispersed or dissolved.

It is preferable that the solution to be added to the polyester reaction system contains 0.05 to 20 wt %, as aluminum atoms, of the aluminum compound and 0.05 to 30 wt % of the alkali compound, since the amount of the foreign matter in the obtained polyester is especially small. If the alkali compound is a nitrogen-containing compound, it is especially preferable that the concentration of the nitrogen-containing compound is 0.05 to 20 wt % as nitrogen atoms, since the amount of the foreign matter in the obtained polyester is small.

The polyester polymerization catalyst used in the present invention can be used in polycondensing the product obtained by either the esterification reaction between an aromatic dicarboxylic acid and a diol, or the ester interchange reaction between an ester forming derivative of an aromatic dicarboxylic acid and a diol.

It is preferable that the aluminum compound of the present invention is added to ensure that the weight of aluminum atoms may be 5 to 500 ppm based on the weight of the obtained polyester. To obtain sufficient catalytic activity, hence to obtain a polymer with a higher molecular weight and a product with sufficient strength, it is preferable that the amount added is 5 ppm or more. Furthermore, to prevent the likelihood to produce the foreign matter, the remarkable rise of filtration pressure at the time of processing and the tendency to worsen the polymer color tone, 500 ppm or less is preferable. A more preferable range is 50 to 400 ppm, and a further more preferable range is 80 to 350 ppm.

It is preferable to add the alkali compound of the present invention by 50 to 5000 ppm based on the weight of the obtained polyester. In view of the effect to inhibit the production of any foreign matter, 50 ppm or more is preferable, and to prevent the worsening of the color tone of the obtained polyester, 5000 or less is preferable. A more preferable range is 70 to 3000 ppm, and an especially preferable range is 80 to 1000 ppm. Among the alkali compounds which can be used in the present invention, some are likely to be dissipated during polymerization reaction, and if any of the compounds is used, the compound is not required to perfectly remain in the finally obtained polymer.

The polymerization catalyst containing aluminum of the present invention can be added to the reaction system at any moment when the polyester is produced, but it is preferable that the molar ratio (the molar ratio of the aromatic dicarboxylic acid or any of its ester forming derivatives to the diol) in the reaction system is 1.25 to 2.0 when the catalyst is added, since the production of the foreign matter can be especially inhibited.

In the case of ester interchange reaction, a molar ratio of about 2.0 is usually adopted, and in this case, the polymerization catalyst containing the aluminum compound can be added as it is, to the reaction system. On the other hand, in the case of esterification reaction, a molar ratio of less than 1.25 may be adopted. So, before the aluminum compound is added, it is preferable to add, for example, a diol by 0.1 to 1.5 times the amount of the aromatic dicarboxylic acid, for satisfying said condition.

In the present invention, it is preferable to use a cobalt compound together, since the polycondensation reaction progresses more quickly and the color tone of the obtained polyester is improved.

The cobalt compound of the present invention is not especially limited, but can be selected, for example, from cobalt acetate tetrahydrate, cobalt nitrate, cobalt chloride, cobalt acetylacetonate, cobalt naphthenate, etc.

It is preferable that the amount of the cobalt compound added is 0.5 to 20 as a molar ratio of aluminum atoms to cobalt atoms (Al/Co). If the molar ratio is in this range, the effects of improving the polymerization activity and the polymer color tone are high, and the heat resistance can also be good. A more preferable range is 1 to 15, and a further more preferable range is 2 to 10.

In the present invention, a polymerization catalyst like a titanium compound such as tetrabutyl titanate or tetrapropyl titanate or an antimony compound such as antimony trioxide or antimony acetate can be used by a small amount together with the aluminum compound as far as the effects intended in the present invention are not impaired.

If the amount of the titanium compound added is smaller than the amount of aluminum atoms added and 50 ppm or less as titanium atoms based on the amount of the polyester, the polymerization time can be shortened, and the color tone of the obtained polymer is in a permissible range. More preferable is 20 ppm or less, and further more preferable is 10 ppm or less.

If the amount of the antimony compound added is smaller than the amount of aluminum atoms added and 50 ppm or less as. antimony atoms based on the amount of the polyester, filament breaking at the time of spinning and film breaking at the time of film formation can be prevented, and in the case of bottles, etc., the transparency is in a permissible range. More preferable is 30 ppm or less, and further more preferable is 10 ppm or less.

The method for producing the polyester of the present invention is described below for a case of polyethylene terephthalate.

High molecular polyethylene terephthalate used for fibers, films, resins or bottles, etc. is usually produced according to either of the following processes; (1) a process comprising the steps of treating terephthalic acid and ethylene glycol as raw materials at about 240 to 270 C. at atmospheric pressure or higher pressure for obtaining low molecular polyethylene terephthalate or oligomer directly by esterification reaction, and furthermore heating it to about 290° C. while reducing the pressure of the system to 133 Pa or less for polycondensation reaction, to obtain the intended high molecular polymer, and (2) a process comprising the steps of heating a reaction system containing dimethyl terephthalate (DMT) and ethylene glycol as raw materials from 150° C. to 240° C. at atmospheric pressure, to obtain a oligomer by ester interchange reaction, and effecting polycondensation reaction as described in (1) to obtain the intended high molecular polymer. The esterification reaction can be effected even without any catalyst, but the ester interchange reaction is usually effected using a compound of manganese, calcium, magnesium, zinc or lithium, etc. as a catalyst and adding a phosphorus compound to inactivate the catalyst used for said reaction, after substantial completion of ester interchange reaction.

In the production method of the present invention, a specific polymerization catalyst containing an aluminum compound and an alkali compound of the present invention is added to the oligomer obtained in the beginning or former half of the process (1) or (2), and then, the polycondensation reaction in the latter half is effected to obtain high molecular polyethylene terephthalate. Furthermore, the reaction can be effected in batch operation, semi-batch operation or continuous operation.

The methods for measuring and evaluating properties in the present invention are described below.

(1) Intrinsic viscosity of polymer [η]Measured with orthochlorophenol as the solvent at 25° C.

(2) Metal content of polymer Obtained according to the fluorescent X-ray method.

(3) Color tone of polymer

Pellets were used as a polymer sample, and the light reflected from the sample was measured using a color difference meter (SM Color Computer Model SM-3) produced by Suga Shikenki K.K. and expressed according to the Hunter expression method (values L, a and b).

(4) Amount of carboxyl end groups of polymer According to Maurice et al.'s method [Anal. Chim. Acta, 22, p. 363 (1960)].

(5) Strength and elongation of fibers

An S—S curve was obtained by Tensilon Tensile Tester produced by Toyo Baldwin at a sample length of 250 mm at a tensile speed of 300 mm/min, to calculate the strength and elongation.

The present invention is described below concretely in reference to examples, but is not limited thereto or thereby.

EXAMPLE 1

Ten parts of aluminum hydroxide were added to 100 parts of an aqueous solution containing 20 wt % of tetraethylammonium hydroxide, and the mixture was stirred to obtain a homogeneous aqueous solution. The aqueous solution was diluted by 90 parts of ethylene glycol, to produce a homogeneous ethylene glycol solution containing tetraethylammonium hydroxide, water and aluminum hydroxide, as a solution containing 1.7 wt %, as aluminum atoms, of an aluminum compound and 10 wt % of an alkali compound.

On the other hand, a polyester was produced from highly pure terephthalic acid and ethylene glycol according to a conventional method. That is, an oligomer produced beforehand was molten and stirred at atmospheric pressure at 250° C., and a slurry consisting of highly pure terephthalic acid and ethylene glycol was gradually added to the oligomer, for esterification reaction, to finally obtain an oligomer not containing a catalyst. To the oligomer, the ethylene glycol solution containing tetraethylammonium hydroxide, water and aluminum hydroxide produced beforehand was added to keep the aluminum atom content at 50 ppm in the finally obtained polyester. The molar ratio of the reaction system in this case was 1.50. Furthermore, cobalt acetate tetrahydrate was added to keep the cobalt atom content at 20 ppm. The oligomer mixture was stirred at 30 rpm, while the reaction system was gradually heated from 250° C. to 285° C., with the pressure reduced to 40 Pa. Both the time taken to reach the final temperature and the time taken to reach the final pressure were 60 minutes. When a predetermined stirring torque was reached, the reaction system was purged by nitrogen and returned to atmospheric pressure, to stop the polycondensation reaction. The product obtained was discharged into cold water as a strand which was immediately cut to obtain polyester pellets.

The obtained polymer was 0.68 in intrinsic viscosity, 29 equivalents/ton in the amount of carboxyl end groups and L=59, a=0.6 and b=5.0 in color tone. The polymer was analyzed by the fluorescent X-ray method, and the aluminum atom content was found to be 50 ppm.

As stated above, the polymerization reactivity was good and the polyester pellets to obtained were also good in their properties.

The pellets were dried, supplied into an extruder type spinning machine and melt-spun at a spinning temperature of 295° C. In this case, a metallic nonwoven fabric with an absolute filtration accuracy of 10 µm was used as the filter, and the spinneret used had a round hole with a diameter of 0.6 mm. The yarn discharged from the spinneret was gradually cooled in a heating cylinder with a length of 30 cm, an inner diameter of 25 cm and a temperature of 300° C., and chimney cooling air was applied to cool and solidify it. It was oiled and taken up at a take-up speed of 550 m/min. The undrawn yarn was drawn at 95° C. with the drawing ratio changed properly to achieve an elongation of 14 to 15% in the intended drawn yarn. Then, it was heat-treated at 220° C. at a relax rate of 2.0%, to obtain a drawn yarn.

In the melt spinning process, little filtration pressure rise was observed at the time of spinning, and the yarn breaking little occurred at the time of drawing, to show that the polymer was good in processability. The results are shown in Table 1.

EXAMPLES 2 TO 12 AND COMPARATIVE EXAMPLES 1 TO 3

Polymers were produced as described in Example 1, except that the kinds and quantities of the metal compound and the alkali compound were changed, and melt-spun. The results are shown in Tables 1 and 2.

The polymers of the present invention were good in physical properties and melt spinning process. However, when a catalyst free from any alkali compound or antimony trioxide only was used for polymerization, the filtration pressure rose remarkably in the melt spinning process, and yarn breaking occurred frequently, to show poor processability.

The filtration pressure rise and yarn breaking in spinning are caused by various causes, and the foreign matter in the polymer is also one of the main causes. In the examples, no or little filtration pressure rise during spinning was expressed as good. In Examples 6 and 7, some filtration pressure rise was observed, but it was judged to conform to the tolerance since it did not affect the normal filter exchange period. No or little yarn breaking in the examples was also expressed as good. The yarn breaking in Examples 6 and 7 occurred at the upper limit of an acceptable range, and was judged to be tolerable in view of operation convenience.

TABLE 1

| | | Metal compounds | | | Properties of polymer | | | | | | | |
| | | | | | Poly- | | Amount of | | | | Spinnability | |
| | | | Amount added based on the amount of polymer (ppm) | | conden- sation reaction time | Intrinsic viscosity | carboxyl end groups (equivalents/ton) | Value L | Value a | Value b | Filtration pressure | Yarn breaking |
| | Compounds used | | Al/Co | | | | | | | | | |
| Example 1 | Aluminum hydroxide Tetraethylammonium hydroxide Cobalt acetate tetrahydrate | Al = 50 Alkali = 283 Co = 20 | 2.5 | | 2:50 | 0.68 | 29 | 59 | 0.6 | 5.0 | Good | Good |
| Example 2 | Basic aluminum acetate Tetraethylammonium hydroxide | Al = 50 Alkali = 736 | — | | 3:00 | 0.65 | 23 | 59 | −0.6 | 9.5 | Good | Good |
| Example 3 | Aluminum chloride Tetraethylammonium hydroxide | Al = 50 Alkali = 1050 | — | | 2:50 | 0.67 | 40 | 53 | 0.8 | 14.0 | Good | Good |

TABLE 1-continued

| | | Metal compounds | | | Properties of polymer | | | | | | | |
|---|---|---|---|---|---|---|---|---|---|---|---|---|
| | | | Amount added based on | | Poly-conden-sation | | Amount of carboxyl end groups | | | | Spinnability | |
| | Compounds used | | the amount of polymer (ppm) | Al/Co | reaction time | Intrinsic viscosity | (equivalents/ ton) | Value L | Value a | Value b | Filtration pressure | Yarn breaking |
| Example 4 | Aluminum hydroxide Tetraethylammonium hydroxide Cobalt acetate tetrahydrate | | Al = 45 Alkali = 1600 Co = 20 | 2.3 | 2:40 | 0.68 | 42 | 51 | 1.5 | 12.0 | Good | Good |
| Example 5 | Aluminum hydroxide Tetraethylammonium hydroxide | | Al = 70 Alkali = 420 | — | 3:00 | 0.65 | 19 | 61 | −0.2 | 9.0 | Good | Good |
| Example 6 | Basic aluminum acetate Tetraethylammonium hydroxide Antimony trioxide | | Al = 60 Alkali = 1260 Sb = 40 | — | 2:40 | 0.70 | 20 | 53 | −0.5 | 8.5 | a) | b) |
| Example 7 | Aluminum hydroxide Triethylamine | | Al = 60 Alkali = 530 | — | 3:00 | 0.63 | 21 | 63 | −0.2 | 7.0 | a) | b) | a) Filtration pressure rose to some extent, but within tolerance.
b) Some yarn breaking occurred, but within tolerance.
c) The "Alkali" in "Amount added based on the amount of polymer (ppm)" means an alkali compound.

TABLE 2

| | | Metal compounds | | | Properties of polymer | | | | | | | |
|---|---|---|---|---|---|---|---|---|---|---|---|---|
| | | | Amount added based on | | Poly-conden-sation | | Amount of carboxyl end groups | | | | Spinnability | |
| | Compounds used | | the amount of polymer (ppm) | Al/Co | reaction time | Intrinsic viscosity | (equivalents/ ton) | Value L | Value a | Value b | Filtration pressure | Yarn breaking |
| Example 8 | Aluminum hydroxychloride Tetraethylammonium hydroxide Cobalt acetate | | Al = 60 Alkali = 6300 Co = 5 | 12 | 3:00 | 0.62 | 42 | 52 | 0.6 | 16.0 | Good | Good |
| Example 9 | Basic aluminum acetate Triethylamine Cobalt acetate | | Al = 30 Alkali = 5300 Co = 50 | 0.6 | 3:00 | 0.66 | 40 | 60 | 1.0 | 8.5 | Good | Good |
| Example 10 | Aluminum hydroxide Sodium hydroxide | | Al = 80 Alkali = 50 | — | 3:00 | 0.64 | 21 | 60 | −0.2 | 9.5 | a) | a) |
| Example 11 | Aluminum acetylacetate Tetraethylammonium hydroxide | | Al = 150 Alkali = 740 | — | 2:30 | 0.69 | 21 | 62 | −0.1 | 7.0 | Good | Good |
| Example 12 | Aluminum isopropoxide Tetraethylammonium hydroxide Tetrabutyl titanate | | Al = 50 Alkali = 420 Tl = 3 | — | 2:30 | 0.70 | 30 | 53 | −0.1 | 10.0 | Good | Good |
| Comparative Example 1 | Aluminum hydroxide | | Al = 70 | — | 3:20 | 0.59 | 23 | 63 | −0.3 | 7.0 | Filtration pressure remarkably rose | Yarn breaking occurred frequently |
| Comparative Example 2 | Antimony trioxide | | Sb = 300 | — | 3:00 | 0.66 | 20 | 46 | −0.6 | 4.5 | Filtration pressure remarkably rose | Yarn breaking occurred frequently |
| Comparative Example 3 | Aluminum chloride Cobalt acetate tetrahydrate | | Al = 60 Co = 20 | 3 | 2:40 | 0.70 | 43 | 51 | −0.2 | 10.0 | Filtration pressure remarkably rose | Yarn breaking occurred frequently | a) Filtration pressure rose to some extent, but within tolerance.
b) Some yarn breaking occurred, but within tolerance.
c) The "Alkali" in "Amount added based on the amount of polymer (ppm)" means an alkali compound.

INDUSTRIAL APPLICABILITY

The polyester obtained by using the polyester polymerization catalyst of the present invention is excellent in processability, and does not cause such problems as spinneret contamination, filtration pressure rise, filament breaking and film breaking when used for producing products such as fibers, films, bottles and resins for injection molding, etc.

We claim:

1. A polyester polymerization catalyst, comprising a solution containing an aluminum compound and an alkali compound selected from the group consisting of alkali metal compounds and nitrogen-containing compounds, with water or an organic solvent or a mixture consisting of water and an organic solvent as the medium.

2. A polyester polymerization catalyst, according to claim 1, wherein the aluminum compound is contained by 0.05 to 20 wt % as aluminum atoms and the alkali compound is contained by 0.5 to 30 wt %.

3. A polyester polymerization catalyst, according to claim 1 or 2, wherein the aluminum compound is an aluminum organic compound represented by the following general formula:

$$Al[OR_1]_l[OR_2]_m[OR_3]_n[R_4]_o \quad (1)$$

(where $R_1$, $R_2$ and $R_3$ stand for, respectively independently, an alkyl group, aryl group, acyl group or hydrogen atom, $R_4$ stands for an alkyl acetoacetate ion or acetylacetone ion, $R_1$, $R_2$ and $R_3$ are identical or different, subject to the condition that at least one of and $R_1$, $R_2$, $R_3$ and $R_4$ does not stand for a hydrogen atom; and l, m, n and o stand for, respectively independently, 0 or a positive number, subject to l+m+n+o=3).

4. A polyester polymerization catalyst, according to claim 3, wherein the aluminum organic compound is at least one selected from a group consisting of aluminum alcholates and aluminum carboxylates.

5. A polyester polymerization catalyst, according to claim 1 or 2, wherein the aluminum compound is at least one compound selected from a group consisting of hydroxides, chlorides and hydroxychlorides of aluminum.

6. A polyester polymerization catalyst, according claim 1, wherein the alkali compound is a nitrogen-containing compound.

7. A polyester polymerization catalyst, according to claim 6, wherein the nitrogen-containing compound is a tertiary amine compound or a quaternary ammonium compound.

8. A method for producing a polyester polymerization catalyst stated in claim 1 comprising the steps of letting water or an organic solvent or a mixture consisting of water and an organic solvent contain said alkali compound, and adding said aluminum compound to the mixture.

9. A method for producing a polyester, in which a product obtained by the esterification reaction or ester interchange reaction between an aromatic dicarboxylic acid or any of its ester forming derivatives and a diol is polycondensed to produce a polyester, comprising the step of using the polymerization catalyst stated claim 1, wherein said amount of the aluminum compound is 5 to 500 ppm as aluminum atoms based on the amount of the obtained polyester.

10. A method for producing a polyester, according to claim 9, wherein the alkali compound is added by 50 to 5000 ppm based on the amount of the obtained polyester.

11. A method for producing a polyester, according to claim 9 or 10, wherein the molar ratio of the reaction system at the moment when the aluminum compound is added (the molar ratio of an aromatic dicarboxylic acid or any of its ester forming derivatives to a diol) is 1.25 to 2.0.

12. A method for producing a polyester, according to claim 9, wherein the diol is added by 0.1 to 1.5 times the amount of the aromatic carboxylic acid or any of its ester forming derivatives, before the aluminum compound is added.

13. A method for producing a polyester, according to claim 9, wherein a cobalt compound is added to ensure that the molar ratio of aluminum atoms to cobalt atoms (Al/Co) is 0.5 to 20.

14. A method for producing a polyester, according to claim 9, wherein a titanium compound is added by an amount smaller than the amount of aluminum atoms added, to ensure that the amount of titanium atoms is 50 ppm or less based the amount of the polyester.

15. A method for producing a polyester, according to claim 9, wherein an antimony compound is added by an amount smaller than the amount of aluminum atoms added, to ensure that the amount of antimony atoms is 50 ppm or less based on the amount of the polyester.

* * * * *